United States Patent
Barnes

(10) Patent No.: US 7,279,812 B2
(45) Date of Patent: Oct. 9, 2007

(54) LIGHT DIRECTION ASSEMBLY SHORTED TURN

(75) Inventor: Ted W. Barnes, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/037,959

(22) Filed: Jan. 18, 2005

(65) Prior Publication Data

US 2006/0158046 A1    Jul. 20, 2006

(51) Int. Cl.
    *H02K 41/00*    (2006.01)
(52) U.S. Cl. .......................................... 310/12; 310/14
(58) Field of Classification Search ................. 310/12, 310/13, 14; 359/199
    See application file for complete search history.

(56) References Cited

U.S. PATENT DOCUMENTS

| | | | | |
|---|---|---|---|---|
| 3,071,036 A | * | 1/1963 | McKnight et al. | 359/220 |
| 3,505,544 A | * | 4/1970 | Helms | 310/13 |
| 3,532,408 A | * | 10/1970 | Dostal | 359/199 |
| 3,619,673 A | * | 11/1971 | Helms | 310/13 |
| 3,743,870 A | * | 7/1973 | Hunt | 310/13 |
| 4,439,699 A | * | 3/1984 | Brende et al. | 310/13 |
| 4,538,880 A | * | 9/1985 | Reinhold | 359/214 |
| 5,051,669 A | | 9/1991 | Hsiao et al. | |
| 5,146,122 A | * | 9/1992 | Hearn et al. | 310/13 |
| 5,177,383 A | * | 1/1993 | Sim | 310/13 |
| 5,402,184 A | * | 3/1995 | O'Grady et al. | 348/764 |
| 5,420,468 A | | 5/1995 | Mody | |
| 5,541,777 A | * | 7/1996 | Sakamoto et al. | 359/824 |
| 5,631,505 A | * | 5/1997 | Stephany et al. | 310/12 |
| 5,808,379 A | * | 9/1998 | Zhao | 310/12 |
| 5,986,827 A | | 11/1999 | Hale | |
| 6,147,818 A | | 11/2000 | Hale et al. | |
| 6,295,154 B1 | | 9/2001 | Loar et al. | |
| 6,313,888 B1 | * | 11/2001 | Tabata | 348/790 |
| 6,720,682 B2 | * | 4/2004 | Hatam-Tabrizi et al. | 310/12 |
| 6,775,043 B1 | * | 8/2004 | Leung et al. | 359/224 |
| 6,836,032 B2 | * | 12/2004 | Vaknin | 310/12 |
| 6,864,602 B2 | * | 3/2005 | Korenaga | 310/12 |
| 6,906,738 B2 | * | 6/2005 | Turner et al. | 347/229 |
| 6,914,710 B1 | * | 7/2005 | Novotny et al. | 359/291 |
| 2002/0050744 A1 | * | 5/2002 | Bernstein et al. | 310/12 |
| 2002/0075746 A1 | * | 6/2002 | Ooishi | 365/230.03 |
| 2002/0130561 A1 | * | 9/2002 | Temesvary et al. | 310/12 |
| 2003/0020996 A1 | * | 1/2003 | Childers et al. | 359/224 |

(Continued)

FOREIGN PATENT DOCUMENTS

EP    0763881    3/2006

OTHER PUBLICATIONS

IBM Technical Disclosure Bulletin, May 1, 1971, vol. 13, Issue 13, pp. 3682-3683.*

*Primary Examiner*—Thanh Lam

(57) ABSTRACT

A light direction assembly comprises a tip-tilt platform having a light direction member and at least one current coil coupled to the tip-tilt platform. The light direction assembly also includes a plurality of magnetic producing devices that are positioned in close proximity to the current coil. The magnetic producing devices are configured to selectively tilt the tip-tilt platform in response to a current flowing through the current coil. At least one shorted turn is also included in light direction assembly and is positioned in close proximity to the current coil.

18 Claims, 13 Drawing Sheets

U.S. PATENT DOCUMENTS

| | | |
|---|---|---|
| 2003/0164997 A1 | 9/2003 | Orcutt et al. |
| 2004/0017620 A1* | 1/2004 | Kaneko et al. ............. 359/824 |
| 2004/0027313 A1* | 2/2004 | Pate et al. .................... 345/30 |
| 2004/0027363 A1 | 2/2004 | Allen |
| 2004/0028293 A1 | 2/2004 | Allen et al. |
| 2005/0099069 A1* | 5/2005 | Koorneef et al. ............. 310/12 |
| 2005/0128443 A1* | 6/2005 | Kang et al. ................. 353/122 |

* cited by examiner

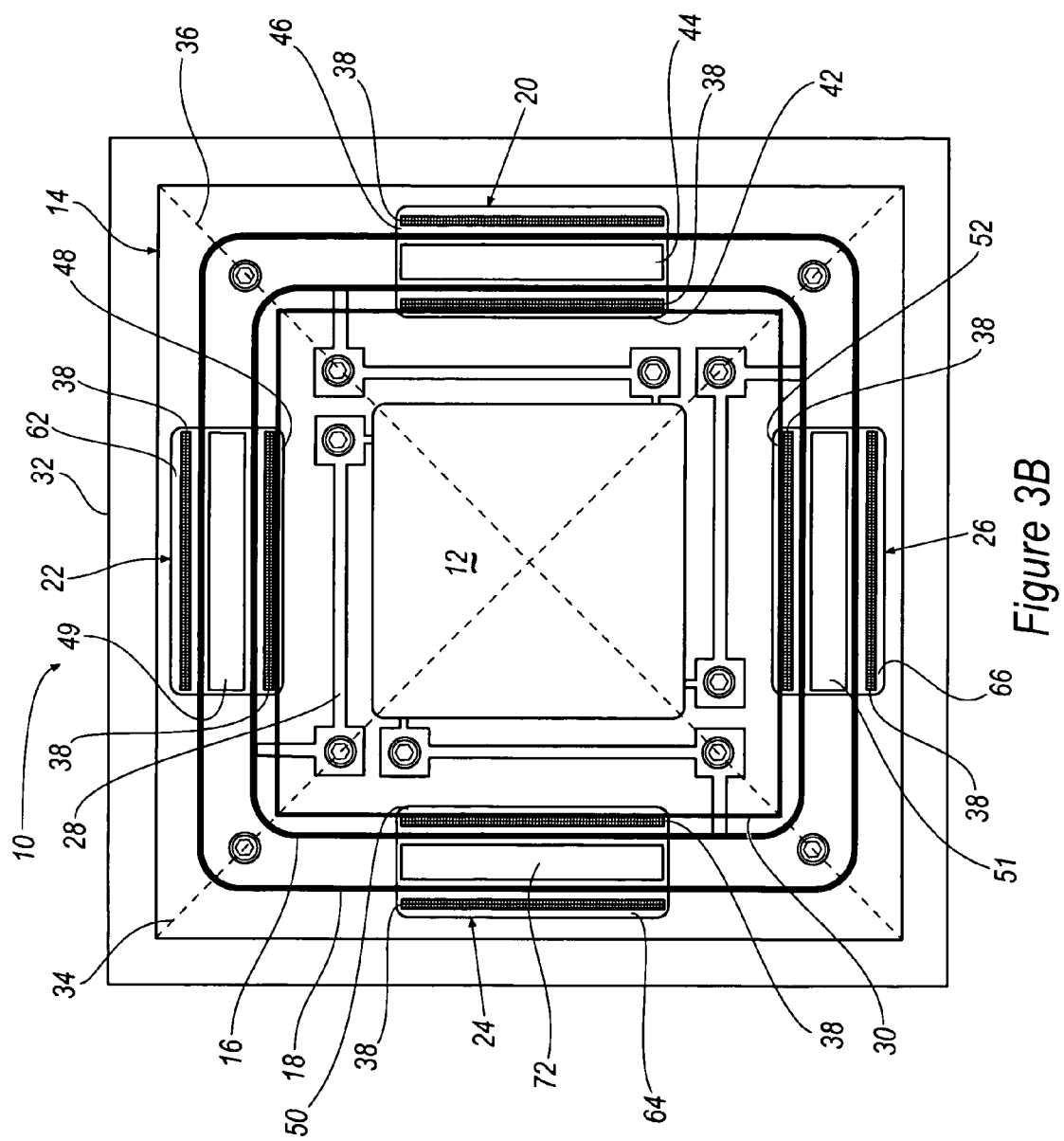

LIGHT DIRECTION ASSEMBLY SHORTED TURN

BACKGROUND

Light direction assemblies are devices used in several applications, such as a display, digital projector, or other imaging systems, for directing and positioning a light image onto a display medium such as a screen. Each of these light direction assemblies may include what are commonly known in the art as tip-tilt platforms that are rotated or moved to direct light and project an image onto a viewing medium. The light directed by the light direction assemblies may either be reflective or refractive. In the case of a reflective tip-tilt platform, a light directing member, such as a mirror, reflects substantially all the light that is incident thereon. Other light directing members control the position of the projected image by refracting light that passes therethrough such as in the case of transparent glass.

The position of a projected image may be controlled by controlling the positioning of the light directing member. The positioning of the light directing member may be controlled by an electromechanical actuator, such as what is known in the art as a wobulator motor. The electromechanical actuator responds to changes in current flow through the actuator's coils. The light directing member, in turn, is rotated or moved in response to the change in flow of the current through the controlling actuator. The faster the rate of change in the current flowing through the coils, the quicker the light directing member can be positioned and repositioned to project an image. The quicker the change in positioning of the light directing member, the higher the quality and the sharper the projected image will be to the viewer. This technique of positioning and repositioning a light directing member at a fast rate (between 60-240 cycles per second in some embodiments) to project an image is known as wobulation, which is described in the following two patent applications: "Image Display System Method", Ser. No. 10/213,555, and "A Two-Axis Tip-Tilt Platform", Ser. No. 10/789,255.

The coils employed by the actuators to flow current typically have a high inductance, as a direct result of the number of windings in the coil, making it difficult to quickly change the rate of current that passes through the coils. A fast rate of change of coil current is needed for swift and accurate motion of the electromechanical actuators. An increase in voltage is typically used to force the desired amount of current through the coils. However, higher voltage sources may add costs as well as present potential regulatory compliance issues.

The embodiments described hereinafter were developed in light of this situation and the drawbacks associated with existing systems.

BRIEF DESCRIPTION OF THE DRAWINGS

The present embodiments will now be described, by way of example, with reference to the accompanying drawings, in which:

FIG. 3B illustrates a top view of the light direction assembly showing a shorted turn according to another exemplary embodiment;

DETAILED DESCRIPTION

A shorted turn for improving the speed of response and degree of dynamic control of a light direction assembly or wobulator is provided. A light direction assembly includes a moveable tip-tilt platform. The tip-tilt platform includes a light direction member, such as a transparent sheet of glass, mirror, etc., for directing light and projecting an image. At least one current coil is also included on the platform. A segment of the current coil is configured to pass through at least one pole stand assembly that is mounted to a base. The pole stand assembly includes a plurality of magnets that are configured to selectively rotate the tip-tilt platform in response to a current that is flowing through the current coil. At least one shorted turn is included and positioned in close proximity to the current coil. The shorted turn is configured to reduce the overall inductance of the current coil, thereby minimizing the time required to change the direction and magnitude of the current flowing though the current coil for a given supply voltage, thus improving the speed of response and degree of dynamic control of the light direction assembly.

Figure 1:
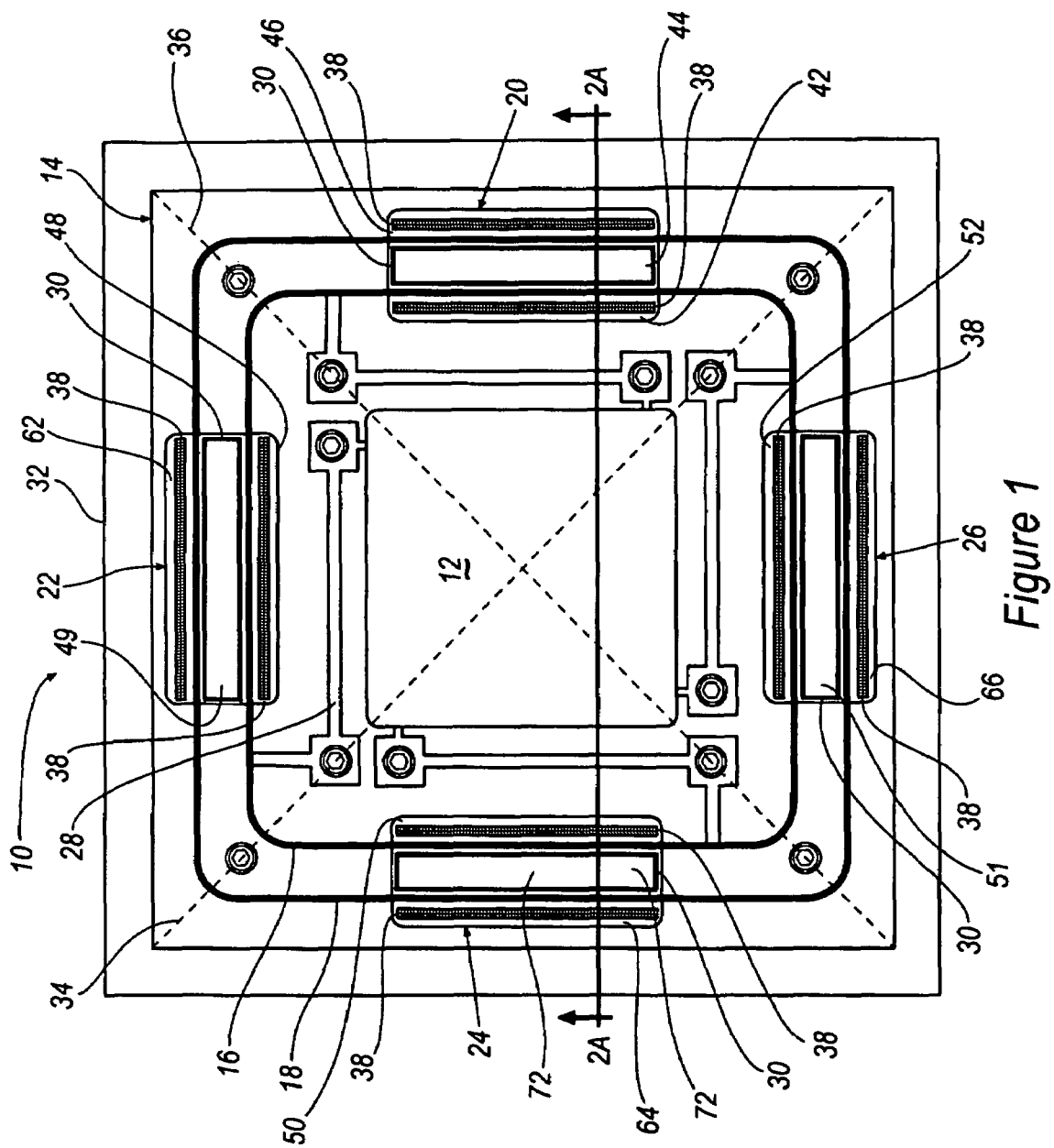
FIG. 1 illustrates a top view of an exemplary light direction assembly including a shorted turn according to an embodiment.

In an exemplary embodiment, FIG. 1 illustrates a light direction assembly 10 that generally includes a light directing member 12 coupled to a tip-tilt platform 14. Light direction assembly 10 also includes an inner current coil 16 and an outer current coil 18 as well as first, second, third, and fourth pole stand assemblies 20, 22, 24, 26, biasing members 28, shorted turns 30, and a base 32. This configuration with shorted turns 30 allows for improved response times and a greater degree of dynamic control of light directing member 12 to produce images of improved quality.

The pole stand assemblies 20, 22, 24, 26 are configured such that selectively controlling the current flowing through inner current coil 16 controls motion of light directing member 12 about a first axis, and selectively controlling the current flowing through outer current coil 18 controls motion of light directing member 12 about a second axis. Consequently, selective and independent application of two currents to inner and outer current coils 16, 18 controls the motion of light direction assembly 10.

Light directing member 12 illustrated in FIG. 1 is configured to "steer" or direct light that comes in contact with its surface. For example, light directing member 12 may be positioned such that light entering light direction assembly 10 from a separate source is directed by light directing member 12. This direction is possible because, as light directing member 12 is moved, an incidence angle is formed between the incident light and light directing member 12.

The physical characteristics of light directing member 12 causes light that enters with an incidence angle to be refracted slightly in the case of a transparent light director, such as transparent glass, and reflected slightly in the case of a mirrored light director. This refraction or reflection results in the light being steered or directed as it contacts light directing member 12. Accordingly, by controlling the positioning of light direction member 12, it is possible to direct the projection of an image. As will be discussed in more detail below, this direction of the projected image allows for enhancement of the image as perceived by the viewer.

The movement of light directing member 12 is accomplished by controlling the movement of tip-tilt platform 14 to which light directing member 12, inner current coil 16, and outer current coil 18 are secured. Tip-tilt platform 14 acts as a frame for light directing member 12, inner current coil 16, and outer current coil 18. Tip-tilt platform 14 may be rotated or tilted with respect to a first axis 34 and a second axis 36. The first and second axes 34, 36 are defined by diagonals taken across tip-tilt platform 14. Consequently, an angle is formed by the crossing of axes 34, 36. In this case of a square tip-tilt platform, the angle formed would be 90 degrees. The 90 degree angle of separation between axes 34, 36 indicates that the axes are normal to each other.

As discussed, tip-tilt platform 14 is selectively rotated or tilted about first and second axes 34, 36. This movement is accomplished by selectively providing current to inner current coil 16 and outer current coil 18. The current provided to each of inner current coil 16 and outer current coil 18 may be provided independently of the current provided to the other coil. As a result, the current flowing through inner current coil 16 may have different characteristics than the current flowing through outer current coil 18. The current flowing through inner current coil 16 and outer current coil 18 passes through magnetic fields in corresponding sections of pole stand assemblies 20, 22, 24, 26. These magnetic fields may be generated by permanent magnets 38 or other device capable of producing a magnetic field, such as an electromagnet. As the current flows past permanent magnets 38, and hence the magnetic fields, a force is applied to inner and outer current coils 16, 18. This force, $F_m$, is characterized by the equation:

$$F_m = Il \times B$$

where I is the current, l is the vector length of the section of wire in the magnetic field, and B is the magnetic field.

Accordingly, the force applied to a given section of inner and outer current coils 16, 18 depends on the orientation of permanent magnets 38 in the pole stand assemblies and the characteristics of the current flowing through that section of the current coil. The current characteristics include the magnitude of the current and the direction the current is flowing.

Another characteristic of the current flowing through inner current coil 16 and outer current coil 18 is the inductance generated by the currents as they flow through their respective coils. Inductance is typified by the behavior of a coil of wire in resisting any change in electrical current through the coil. Inductance is the by-product of the constant changing of the current flowing through inner current coil 16 and outer current coil 18. For a fixed mass, magnetic field intensity, and number of turns on the coil, the wobulator's mechanical speed-of-response is a direct function of the magnitude and direction of current flowing through inner current coil 16 and outer current coil 18. Although increasing the number of coil turns is one way to increase the applied force, and hence the response speed of the wobulator, increasing the number of coil turns also increases the inductance, requiring a higher applied voltage to overcome the increased inductance. As stated above, a higher voltage requirement may add cost to the system and may present regulatory compliance concerns as well.

When voltage is applied to the coil to generate a current to tilt tip-tilt platform 14 in response to a request for a new position, the current flow, I(t), may be characterized by the following equation:

$$I(t) = \frac{V_s}{R_s + R_c}\left(1 - e^{-\left(\frac{R_s + R_c}{L_c}\right)t}\right)$$

where $V_s$ is the supply voltage, $R_s$ is the resistance of the voltage supply, $R_c$ is the resistance of the coil, $L_c$ is the inductance of the coil, and t is time. Because current accelerates the tip-tilt platform 14, the fastest acceleration corresponds to the fastest change in current. For a fixed applied voltage, the coil inductance of the wobulator limits the amount of current that can flow into or out of the coil during transient conditions. By limiting the inductance produced in the coils, for a given voltage, the time required to change the rate of flow of the current is decreased, thereby increasing acceleration and decreasing the period time between each repositioning of tip-tilt platform 14. This will result in swifter and more accurate positioning yielding higher resolution images and increasing the perceived image quality of an image projected by light direction assembly 10.

Inner current coil 16 and outer current coil 18 may be characterized as inductors. Inductors are effectively storage devices for energy, energy that resists a rapid change in direction and magnitude of current flow. This store of energy should be minimized if current is to be changed quickly and acceleration rates of light direction assembly increased to achieve the highest quality projected image. The energy stored in the inductors may be minimized by lowering the inductance of the coil.

Accordingly, light direction assembly 10 includes shorted turns 30 to decrease the inductance, thereby reducing the rise time of current applied to the inner and outer coils without significantly reducing the magnetic flux in the air gap of the pole stands. Shorted turns 30 should be positioned in close proximity to inner current coil 16 and outer current coil 18 and are generally comprised of a non-magnetic, electrically conductive material, such as, for example, copper or aluminum.

Forces applied to inner current coil 16 and outer current coil 18 by the varying magnetic fields are countered by spring forces. In this particular embodiment, cantilever springs 28 are attached to tip-tilt platform 14 and base 32. As tip-tilt platform 14 is moved, opposing corners rotate about either first axis 34 or second axis 36. As a result, an opposing corner moves away from base 32 in response to the force applied to inner current coil 16 and outer current coil 18. This motion deflects springs 28. The amount of force applied by springs 28 to oppose the force applied to inner current coil 16 and outer current coil 18 depends on the distance springs 28 are deflected and the spring constant of the material of springs 28.

Figure 2A:
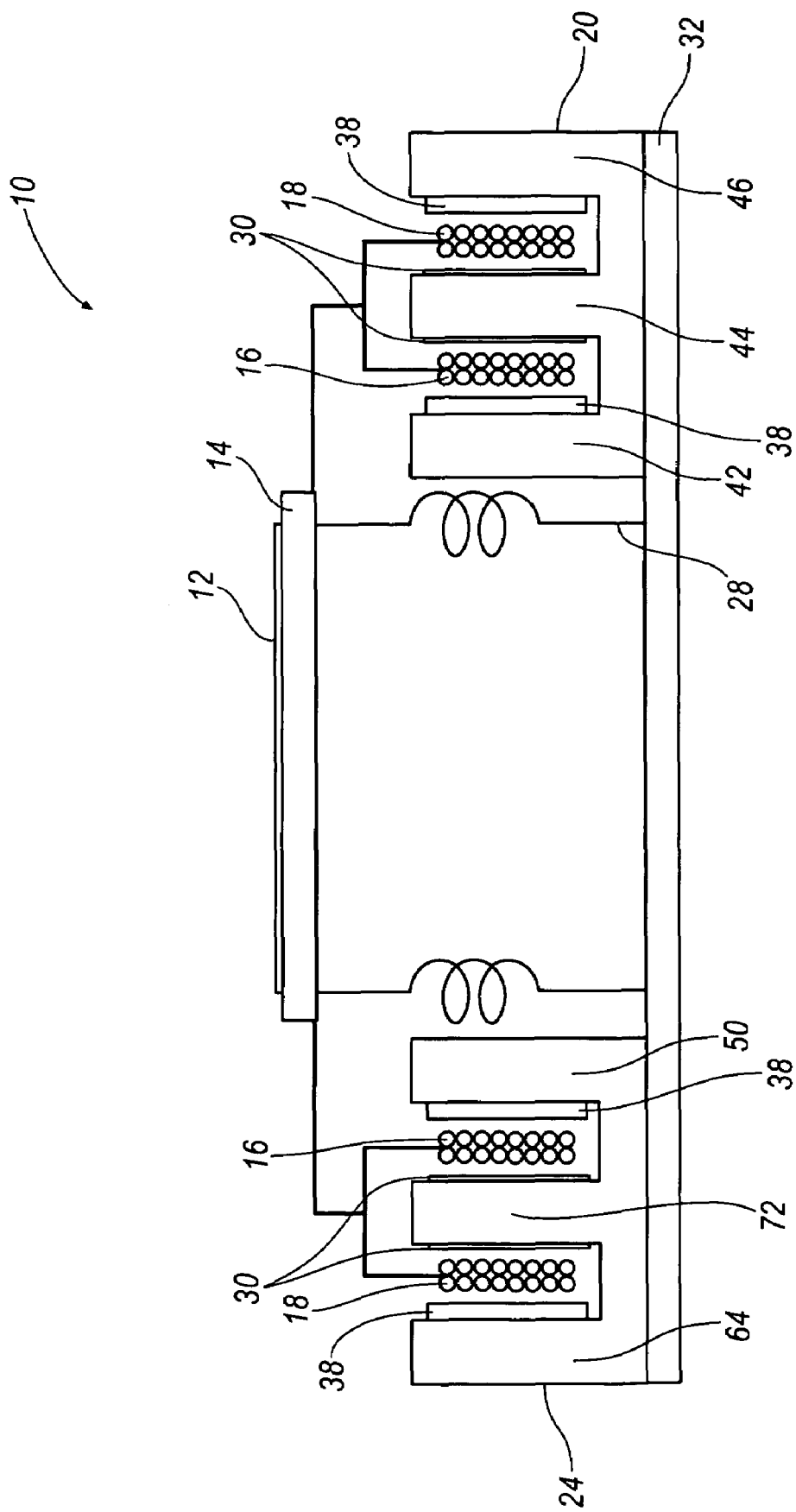
FIG. 2A illustrates a cross sectional view of the light direction assembly taken along section 2A-2A of FIG. 1 showing a shorted turn according to an embodiment.
Figure 2B:
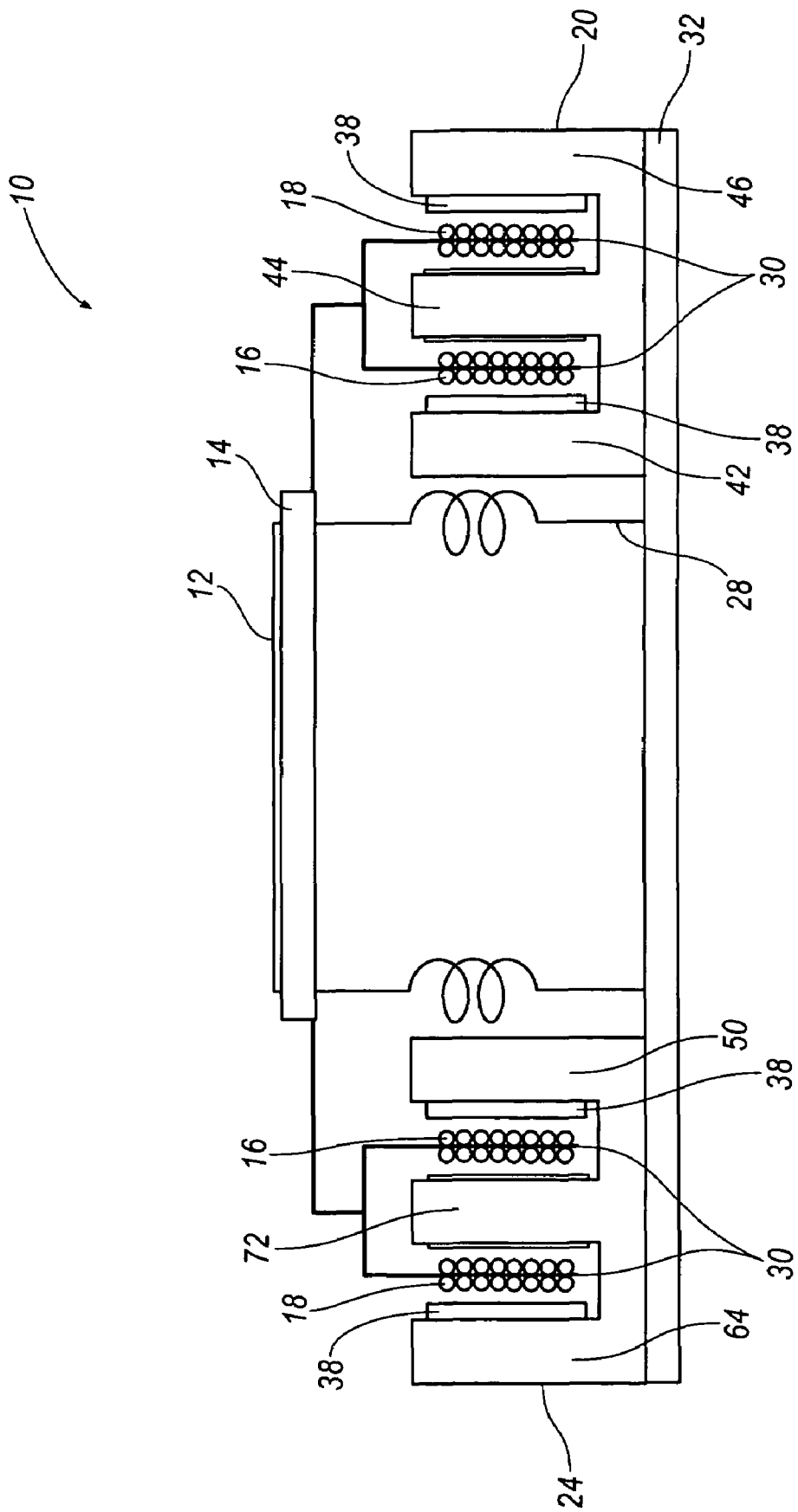
FIG. 2B illustrates a cross sectional view of the light direction assembly showing a shorted turn according to another exemplary embodiment.
Figure 2C:
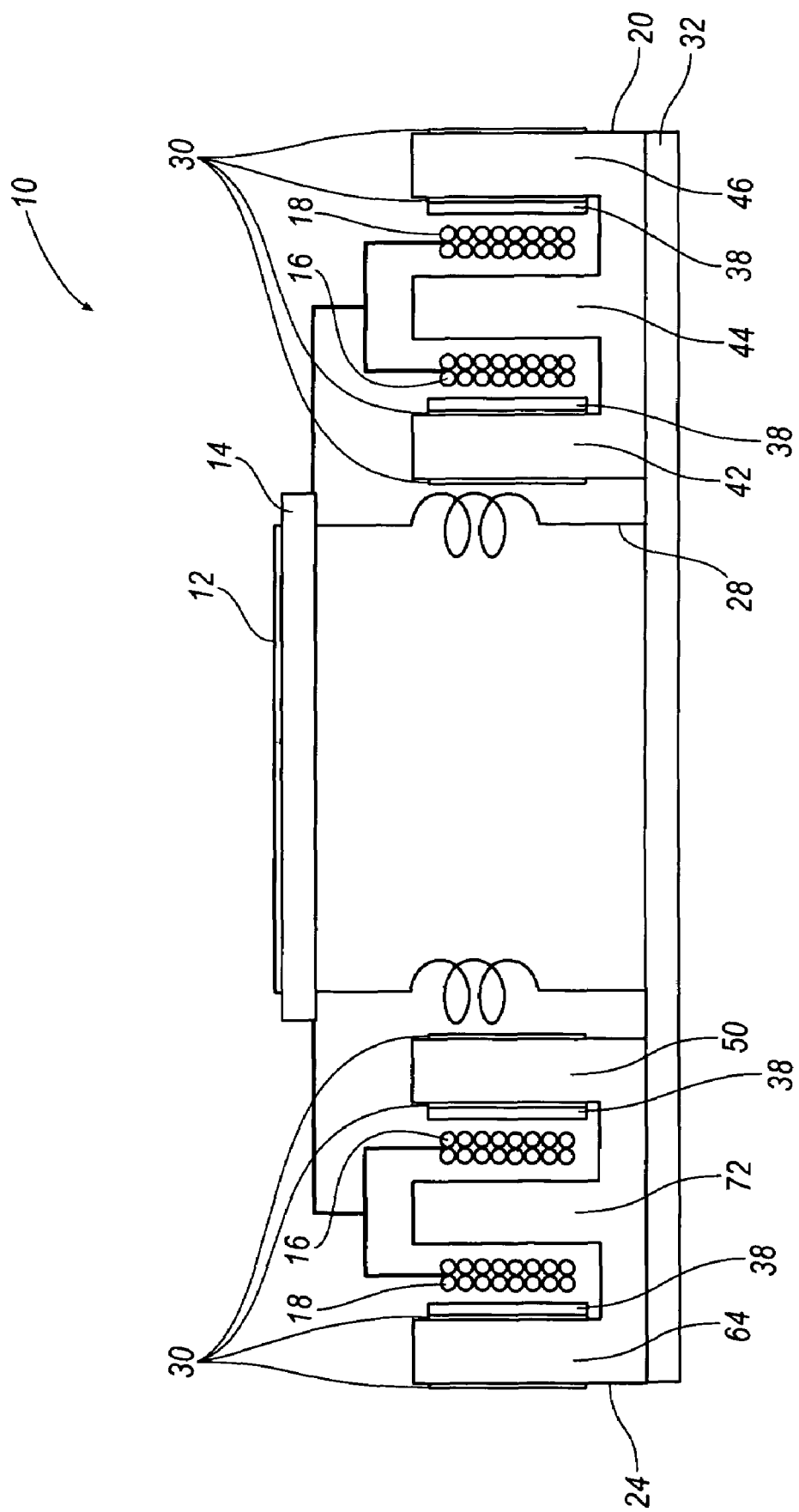
FIG. 2C illustrates a cross sectional view of the light direction assembly showing a shorted turn according to another exemplary embodiment.

Each of the pole stand assemblies 20, 22, 24, 26 include an inner pole stand 42, 48, 50, 52 a center pole stand 44, 49, 72, 51 and an outer pole stand 46, 62, 64, 66. In the exemplary embodiment, each of the pole stand assemblies also include permanent magnets 38 on each one of the inner walls of inner pole stand 42, 48, 50, 52 and outer pole stand 46, 62, 64, 66. It is important to note, however, that other magnet configurations are possible. For example, permanent magnets 38 may be included in center pole stand 44, 49, 72, 51. The pole stand assemblies may be manufactured from a magnetic flux conducting material to optimize the magnetic flux lines. In an embodiment illustrated in FIG. 2A, shorted turns 30 may be positioned around center pole stand 44, 72. In another embodiment illustrated in FIG. 2B, shorted turns 30 may be incorporated into the bobbins of both inner current coil 16 and outer current coil 18. In yet another embodiment illustrated in FIG. 2C, shorted turns 30 may be positioned around the inner pole stand 42, 50 and outer pole stand 46, 64.

Figure 3A:
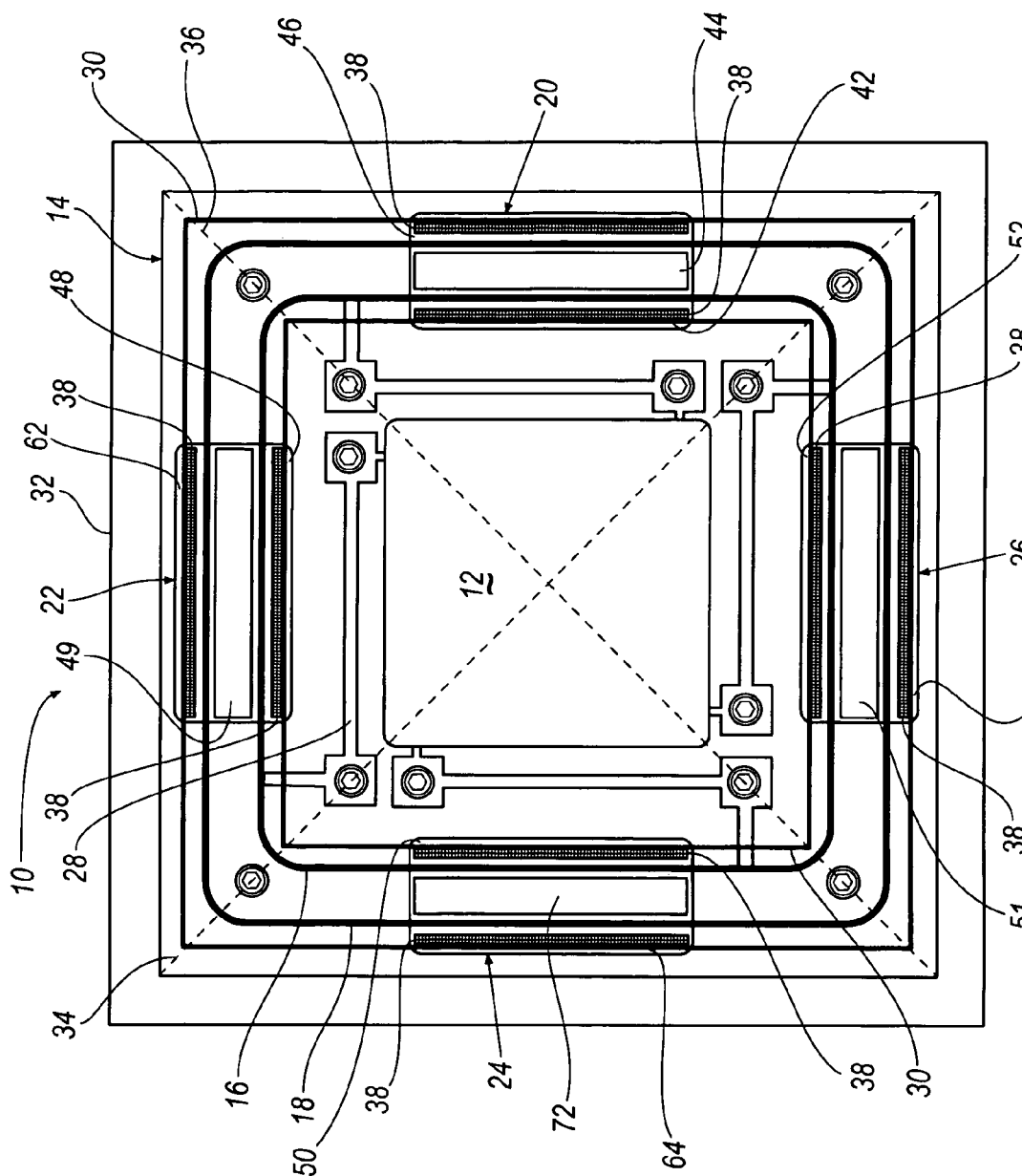
FIG. 3A illustrates a top view of the light direction assembly showing a shorted turn according to another exemplary embodiment.
Figure 3C:
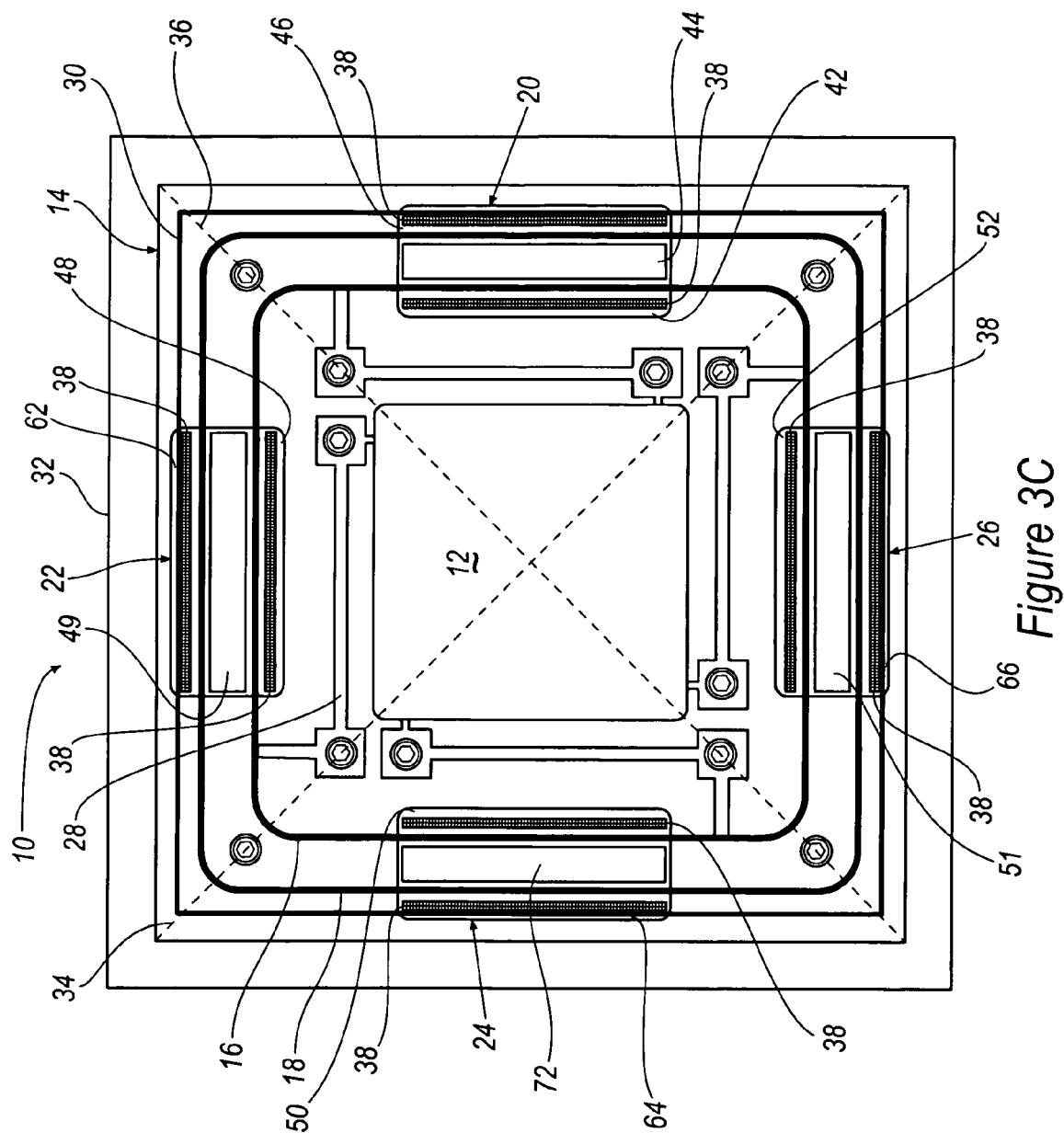
FIG. 3C illustrates a top view of the light direction assembly showing a shorted turn according to another exemplary embodiment.

FIGS. 3A-3C illustrate still further exemplary embodiments. These particular embodiments differ from the previous embodiments in that shorted turns 30 are positioned such that they surround light directing member 12 rather than the individual pole stand assemblies. In FIG. 3A, two separate shorted turns 30 are shown coupled to each of inner pole stands 42, 48, 50, 52 and outer pole stands 46, 62, 64, 66 of pole stand assemblies 20, 22, 24, and 26. FIG. 3B illustrates a single shorted turn 30 coupled to inner pole stands 42, 48, 50, 52 of pole stand assemblies 20, 22, 24, and 26. FIG. 3C illustrates a single shorted turn 30 coupled to outer pole stands 46, 62, 64, 66 of pole stand assemblies 20, 22, 24, and 26.

Figure 4A:
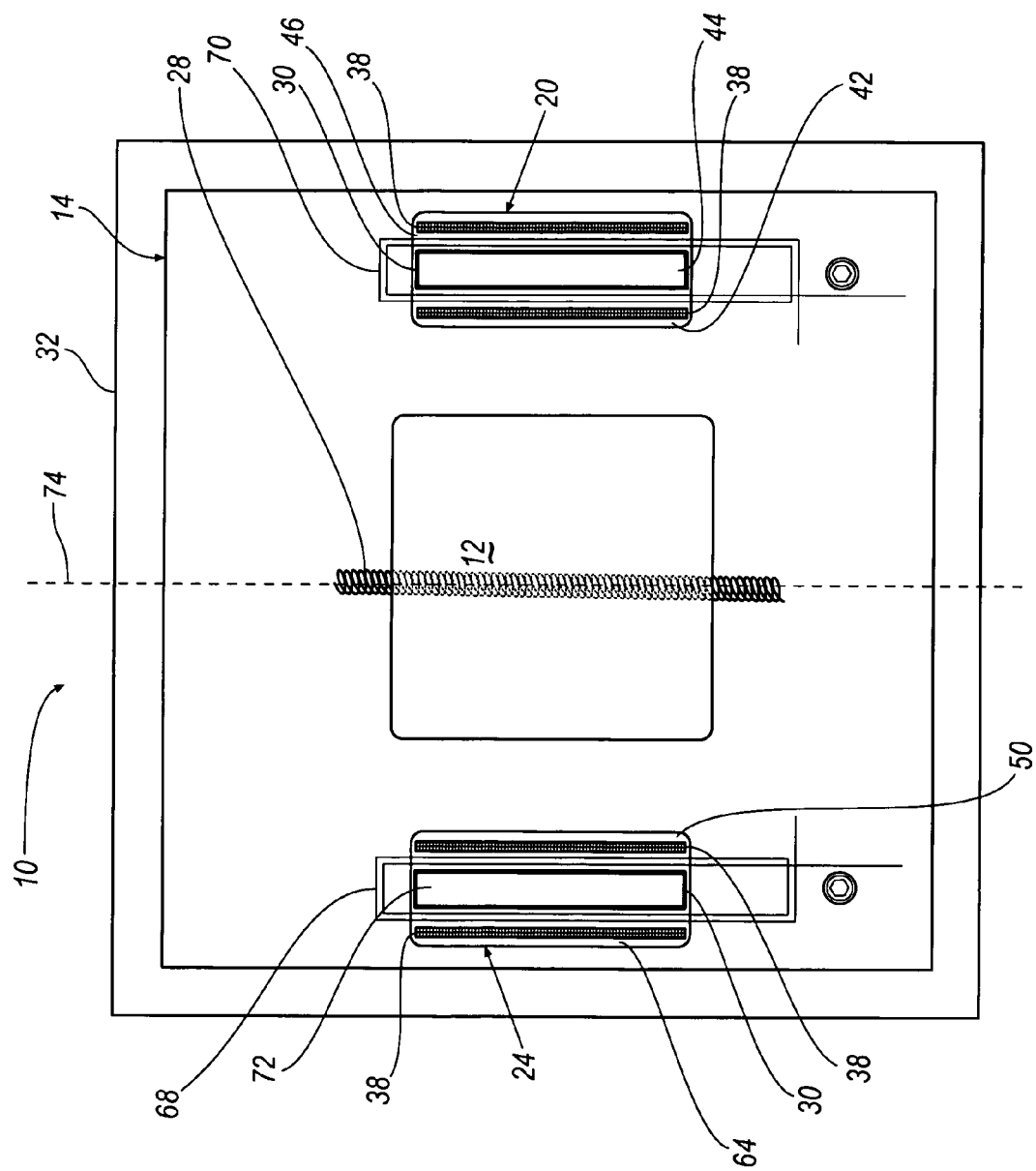
FIG. 4A illustrates another exemplary light direction assembly including a shorted turn according to another embodiment.
Figure 4B:
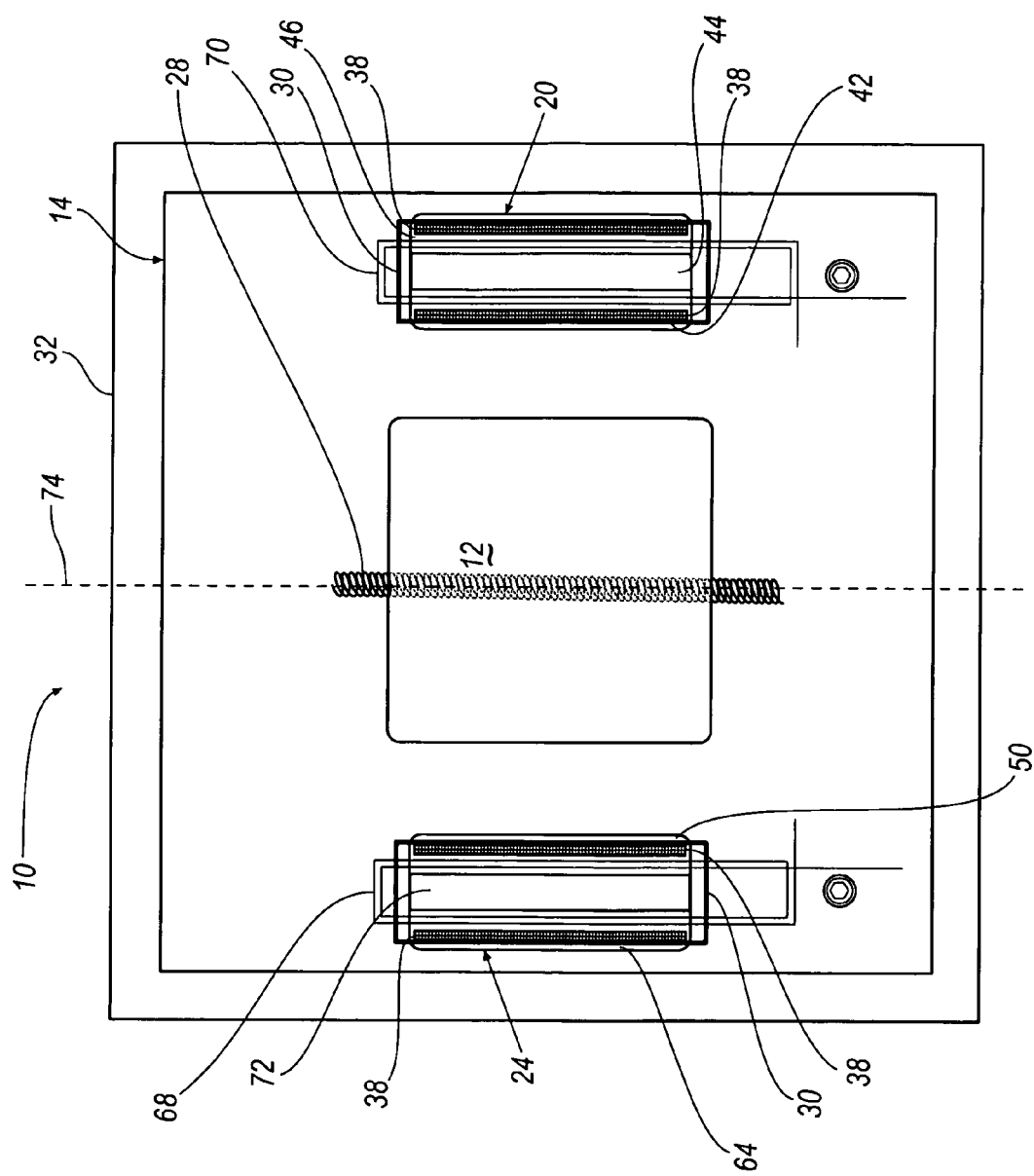
FIG. 4B illustrates the light direction assembly of FIG. 4A including a shorted turn according to another exemplary embodiment.
Figure 4C:
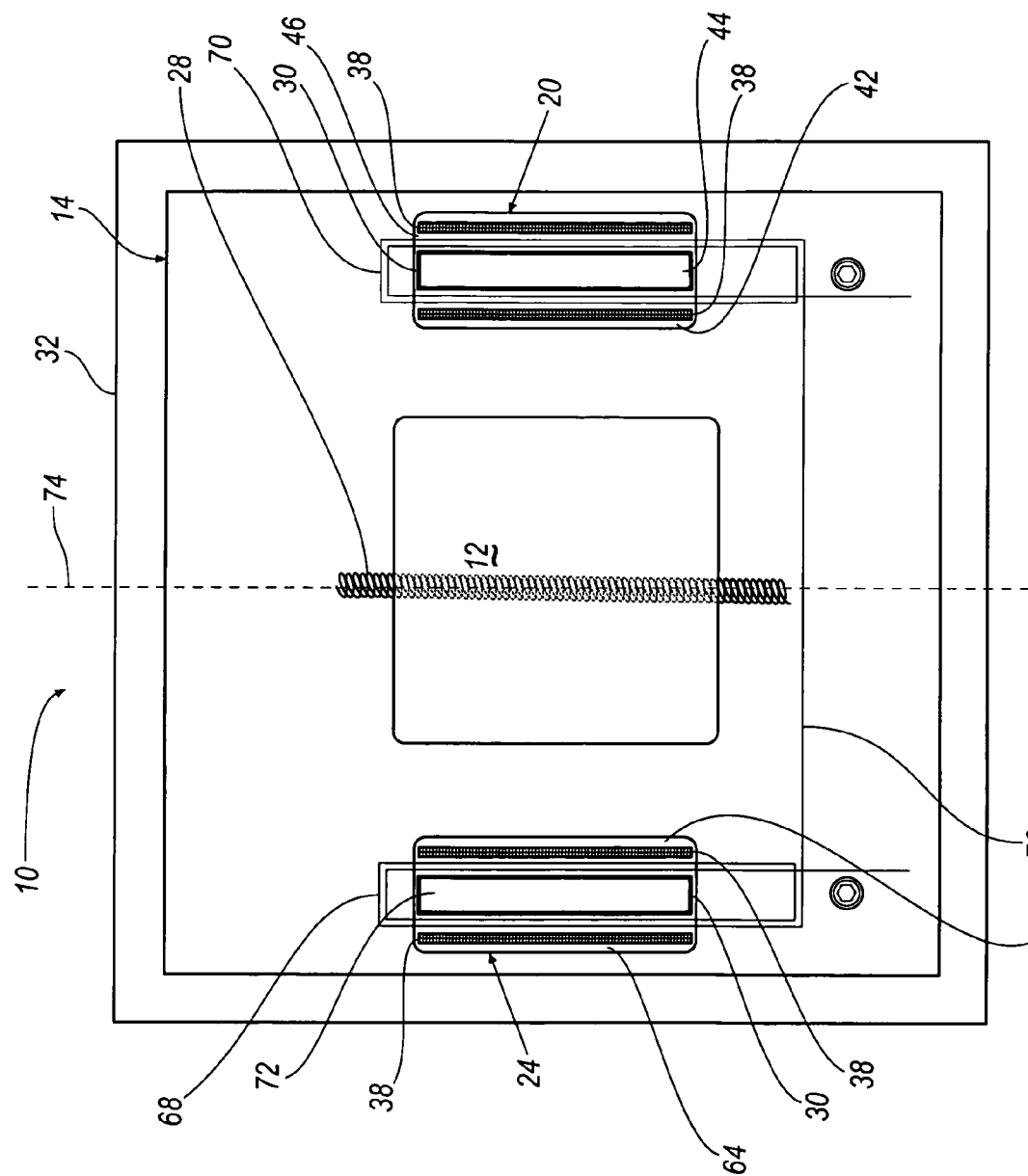
FIG. 4C illustrates another exemplary light direction assembly including a shorted turn according to an embodiment.

Now referring to FIGS. 4A-4C, further exemplary embodiments of light direction assembly 10 having shorted turns 30 are illustrated. In these particular embodiments, rotation about a single axis is illustrated instead of the two axis rotation described above. Also, the biasing member 28 used in these particular embodiments is a torsional spring instead of the cantilever springs described previously. Two pole stand assemblies 20 and 24 are employed in the manner described above to control a single axis 74 of rotation that passes between pole stand assemblies 20 and 24 and through the center of light directing member 12. Two current coils 68 and 70 are used to control the current that is passing through pole stand assemblies 20 and 24 in the manner described previously. The multiple turns of current coils 68 and 70 as shown in FIGS. 4A-4C illustrate the potential to have hundreds of turns of wire, each forming a layer wound on top of each other, passing through the pole stand assemblies. As illustrated in FIG. 4A, shorted turns 30 are included in pole stand assemblies 20 and 24 and are shown coupled to center pole stand 44, 72 (see, e. g., FIG. 2A). Shorted turns 30 may also be coupled to inner pole stand 42, 50 and outer pole stand 46, 64 as discussed above (see, e. g., FIG. 2C) and shorted turns 30 may also be incorporated into the bobbins of current coils 68 and 70 (see, e. g., FIG. 2B). In FIG. 4B shorted turns 30 are shown wound about center pole stand 44, 72, however, in this particular embodiment, shorted turns 30 are coupled to inner pole stands 42, 50 and outer pole stands 46, 64 just inside magnets 38.

Now referring to FIG. 4C, current coils 68 and 70 are connected by a wire 76. Wire 76 allows current to flow in current coils 68 and 70 in opposite directions. This configuration may be advantageous when use of a single current source is desired instead of using two current sources. Use of wire 76 or removing it could prove useful because it would allow maximum flexibility to configure the magnetic pole directions of the pole stand assemblies.

Figure 5:
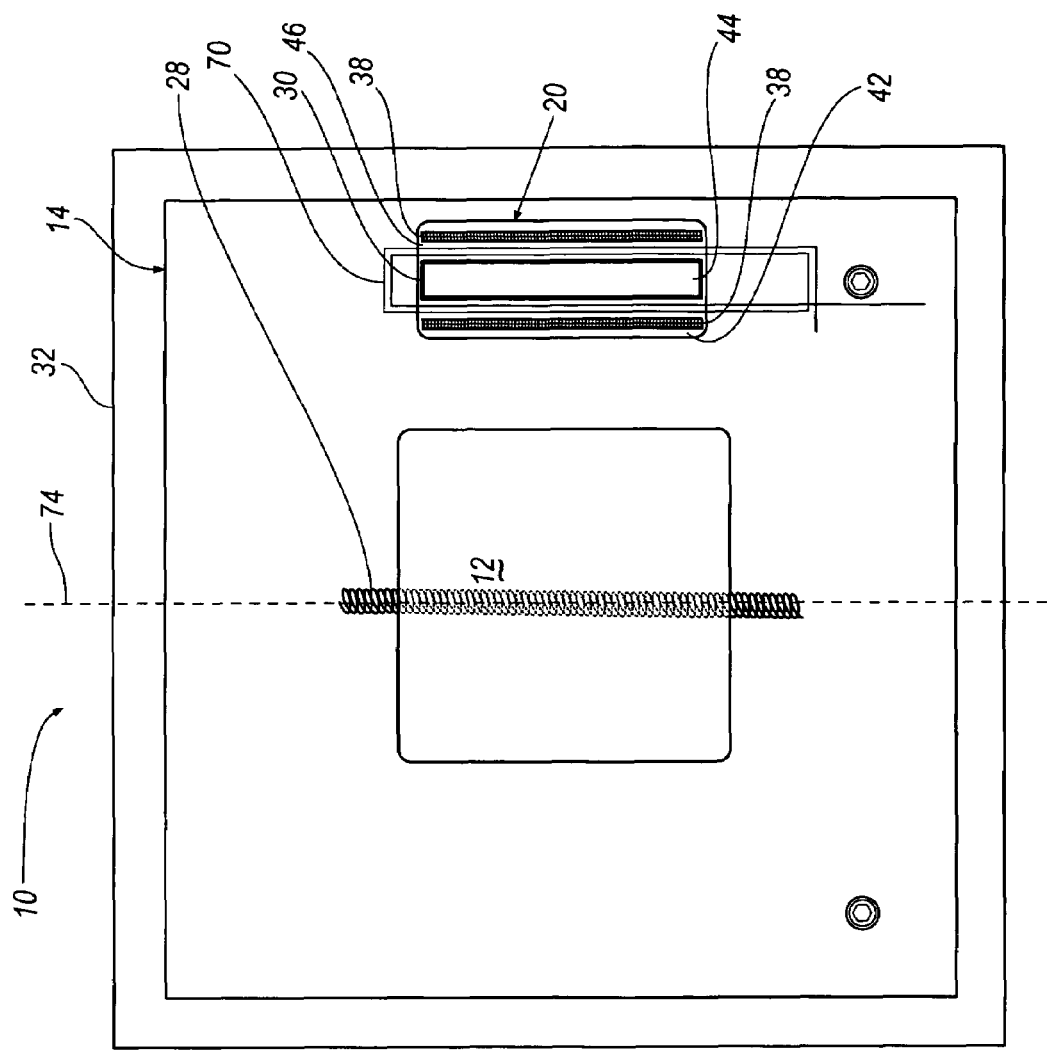
FIG. 5 illustrates another exemplary light direction assembly including a shorted turn according to an embodiment.

Now referring to FIG. 5, light direction assembly 10 is illustrated according to another exemplary embodiment. In this particular embodiment, a single pole stand assembly 20 is employed to effectuate the tilt action of light directing member 12 about axis 74. Current coil 70 is employed as a single coil for controlling the rotating direction of light directing member 12. Shorted turn 30 is coupled to center pole stand 44 and operates in the same manner as described above to allow for improved current control that results in an enhanced projected image. This embodiment illustrates a typical placement of shorted turn 30 and does not represent all possible placements (see, e.g., FIGS. 2A-2C, 3A-3C, 4A, and 4B).

In each of the embodiments described above, shorted turns 30 should not contact either inner current coil 16 or outer current coil 18. Shorted turns 30 may be placed anywhere in proximity to the current coils such that the magnetic field couples to the shorted turn through mutual inductance. The embodiments illustrate typical placements of shorted turns 30 and do not represent all possible placements.

Figure 6B:
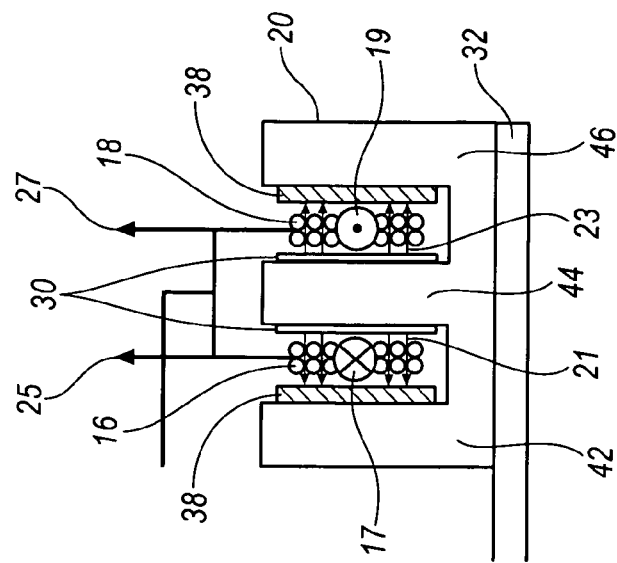
FIG. 6B illustrates a partial cross sectional view of the light direction assembly showing the interaction of a magnetic field and an applied current taken along section 6B-6B of FIG. 6A.
Figure 6A:
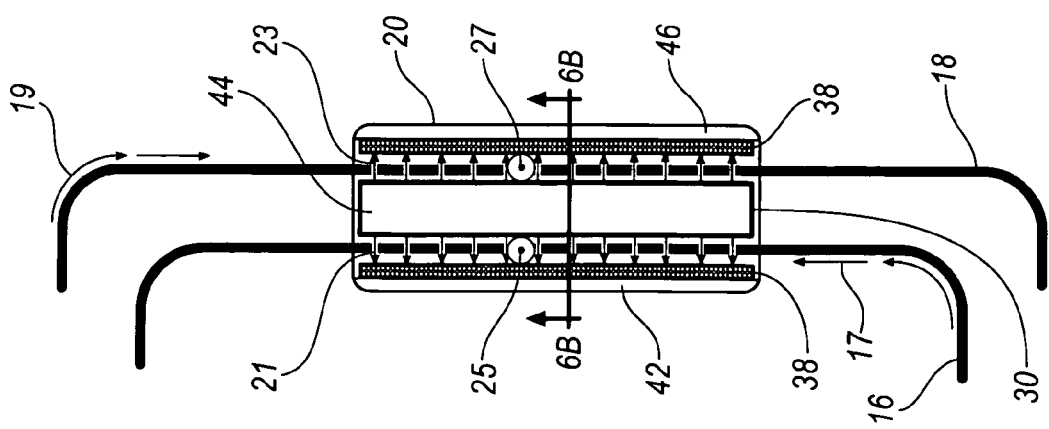
FIG. 6A illustrates a partial view of the light direction assembly showing the interaction of a magnetic field and an applied current according to an exemplary embodiment.

FIGS. 6A and 6B illustrate the currents, magnetic fields, and resulting magnetic forces caused by flowing currents through inner current coil 16 and outer current coil 18 that are coupled to pole stand assemblies 20, 22, 24, 26.

For ease of reference, inner current coil 16 and outer current coil 18 are shown separated from tip-tilt platform 14 and are described with reference to first pole stand assembly 20. It should be understood that first pole stand assembly 20 is substantially similar to second, third, and fourth pole stand assemblies 22, 24, 26 illustrated in FIGS. 1 and 3A-3C and similar to third pole stand assembly 24 illustrated in FIGS. 4A-4C. The description of first pole stand assembly 20 discussed with reference to FIGS. 1-5 may be applied to pole stand assemblies 22, 24, 26. Further, the currents flowing through inner current coil 16 and outer current coil 18 may be separately controlled such that only one current coil has current flowing at any given moment. Also, current coils 16 and 18 of FIGS. 1-3C are representative of current coils 68 and 70 of FIGS. 4A-5 and the discussion of the operation of current coils 16 and 18 may be applied to current coils 68 and 70.

FIG. 6A is a partial view of light direction assembly 10 and illustrates the positioning of shorted turns 30 according to an embodiment and their relationship to the magnetic and electric fields. In FIG. 6A, the currents 17, 19 shown are flowing in the plane of the page, the magnetic fields 21, 23 are in the plane, and the magnetic forces 25, 27 (this is the actual physical force on the coils due to the current interacting with the magnetic flux) are coming out of the page, as indicated by the two concentric circles. FIG. 6A also illustrates how current in each of inner current coil 16 and outer current coil 18 may be controlled independently.

FIG. 6B is a cross-sectional view of FIG. 6A taken along section 6B-6B again illustrating the positioning of shorted turns 30 on first pole stand assembly 20 according to an embodiment. The current 17 of inner current coil 16 is shown flowing into the page, as indicated by the circle having an "x" therein, while the magnetic field 21 is again shown in a direction across the page, resulting in a magnetic force 25 going up. Similarly, the current 19 of outer current coil 18 is shown flowing out of the page, as indicated by the concentric circles. The magnetic field 23 across outer pole stand 46 is in a direction across the page, in the opposite direction of the magnetic field corresponding to inner pole stand 42. The resulting force 27 on outer current coil 18 is also in the upward direction.

Permanent magnets 38 create the magnetic fields around first pole stand assembly 20. A segment of inner current coil 16 is placed between inner pole stand 42 and center pole stand 44. A segment of outer current coil 18 is placed between center pole stand 44 and outer pole stand 46 as well. Placing the segments of the current coils within first pole stand assembly 20 places the current coils within the magnetic field. As a result, current flowing through the current coils passes through the magnetic fields. A shorted turn reduces the inductances of inner current coil 16 and outer current coil 18 generated from the current passing therethrough.

In the exemplary embodiment, the currents are flowing substantially normal to the magnetic fields. The interaction between the current flowing through the current coils and the magnetic fields results in upward magnetic forces on the current coils. Reversing the current flowing through the current coils reverses the direction of the resulting forces. The response time of light direction assembly 10 in repositioning light directing member 12 as a result of the reversal in current flow is decreased by shorted turn 30 as described above.

As will be discussed in more detail below, the arrangement of the magnets and their corresponding magnetic fields allow for a selective application of current. The arrangement of shorted turn 30 provides for a reduction in the inductance generated by inner current coil 16 and outer current coil 18 allows for improved controllability of light directing member 12. Control of inner current coil 16 results in control of movement about first axis 34. Similarly, selective application of current to outer current coil 18 allows for control of movement about second axis 36. Accordingly, control of the application of current may be used to independently control the movement of tip-tilt platform 14 about first axis 34 and/or second axis 36.

As discussed, inner pole stands are configured to allow control of movement about first axis 34. Permanent magnets 38 of first and second inner pole stands 42, 48 produce magnetic fields directed in the same direction and the third and fourth pole stands 50, 52 produce magnetic fields in the opposite direction.

Figure 7:
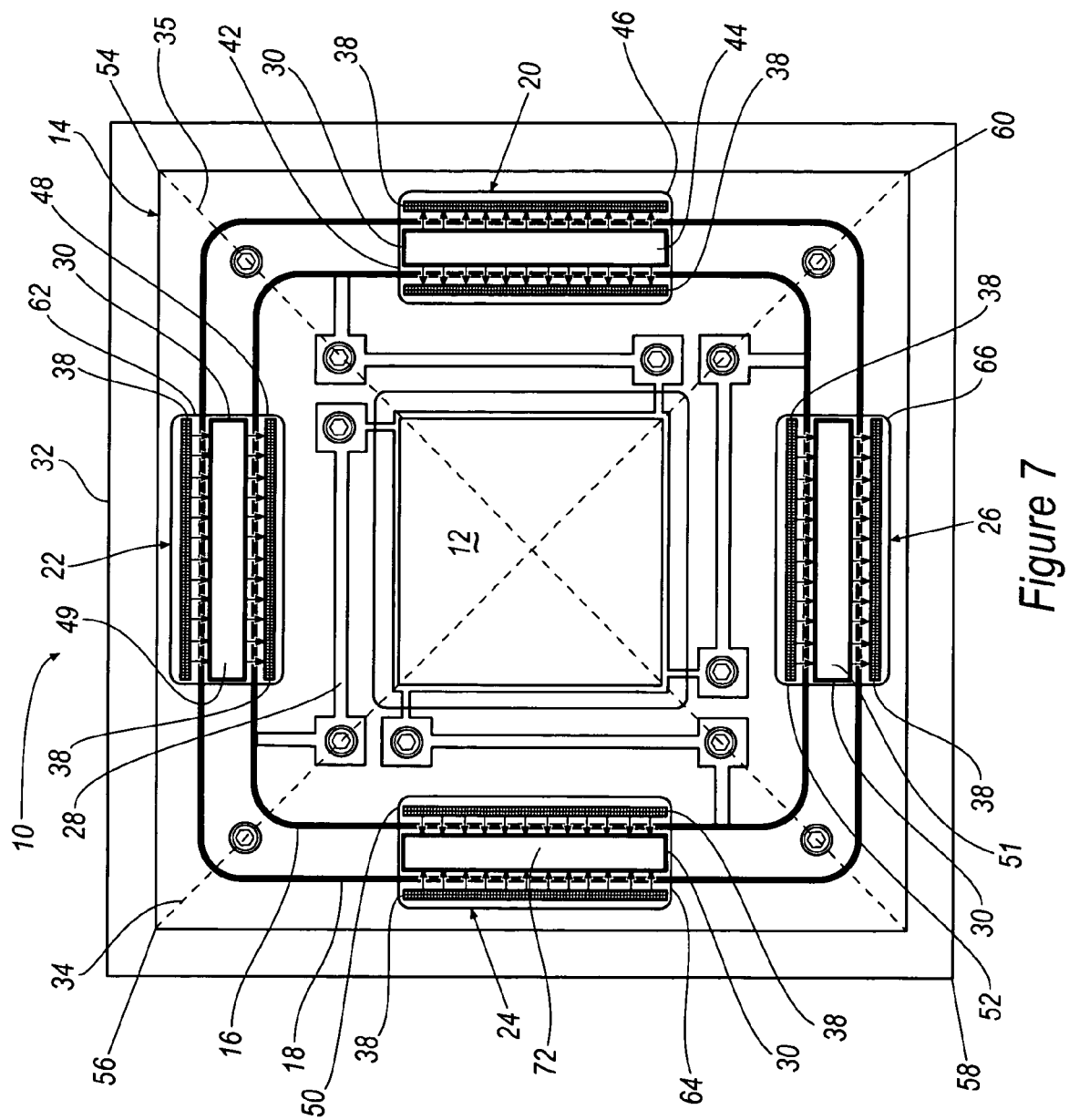
FIG. 7 illustrates a top view of the light direction assembly showing the arrangement of magnetic fields according to an exemplary embodiment.

FIG. 7 illustrates an exemplary configuration of the magnetic fields (shown as arrows on the page) of the pole stand assemblies. The permanent magnet 38 of first inner pole stand 42 produces an inwardly directed magnetic field. Similarly, the permanent magnet 38 of second inner pole stand 48 produces an inwardly directed magnetic field. The permanent magnets 38 of third and fourth inner pole stands 50, 52 of the third and fourth pole stand assemblies 24, 26 produce outwardly directed magnetic fields.

The application of a counterclockwise current to inner current coil 16 across permanent magnets 38 of the first and second inner pole stands 42, 48 produces an upward force. The application of their current to permanent magnets 38 of the third and fourth inner pole stands 50, 52 results in a downward force. The opposing forces created by the opposing magnetic fields result in a movement about first axis 34. Accordingly, a first corner 54 of tip-tilt platform 14 is raised while a third corner 58 is lowered. First axis 34 extends between second and fourth corners 56, 60 of tip-tilt platform 14.

When the current is reversed, the current flows clockwise. As a result, forces are reversed such that third corner 58 of tip-tilt platform 14 is raised while first corner 54 is lowered. Accordingly, switching the direction of current flow causes tip-tilt platform 14 to rotate about first axis 34. In the case of one axis rotation, control of current in inner current coil 16 may be sufficient. In addition, the direction of the magnetic fields produced by permanent magnets 38 may be reversed and still allow tilt control about first axis 34.

Control of a current in outer current coil 18 adds a second axis 36 of control. Permanent magnets 38 of second and third outer pole stands 62, 64 produce magnetic fields directed in the same direction while permanent magnets 38 of first and fourth outer pole stands 46, 66 also produce magnetic fields directed in the same direction, but in a direction opposite to that produced by second and third outer pole stands 62, 64. In FIG. 5, permanent magnets 38 of second and third outer pole stands 62, 64 produce inwardly directed magnetic fields while permanent magnets 38 of first and fourth outer pole stands 46, 66 produce outwardly directed magnetic fields.

The application of a clockwise current to outer current coil 18 across permanent magnets 38 of second and third outer pole stands 62, 64 produces an upward force. This current flowing past permanent magnets 38 of the first and fourth outer pole stands 46, 66 results in a downward force. The opposing forces created by the opposing magnetic fields result in a tilt about second axis 36. Accordingly, first corner 54 of tip-tilt platform 14 is raised while fourth corner 60 is lowered. When the current is reversed, the direction of the force, and hence the orientation of the tilt, is also reversed.

Generally light direction assembly 10 is coupled to a controller (not shown) that is configured to independently control the current flowing through inner current coil 16 and outer current coil 18. The controller may control both the magnitude and direction of current flow to position light directing member 12 for projecting the highest quality viewable image.

The controller drives tip-tilt platform 14 through each of four separate positions as described above. These positions correspond to moving the projected image one-half pixel distance between each position. A one-half pixel distance is half the size of a typical pixel of the projected image. For example, the distance between a first position and a second position corresponds to a one-half pixel distance. Similarly, the distance between the second and a third position, the third and a fourth position, and fourth and first positions corresponds to a one-half pixel distance. Tip-tilt platform 14 may be moved to an infinite number of positions within a one-half pixel distance from the prior position by varying the magnitude and direction of current flow.

By constantly moving the image by a one-half pixel distance in the pattern described above at a rate that is less than the flicker rate of the eye (i.e. faster than the eye and brain can perceive the image), the perceived quality of the image projected is effectively doubled. For example, the current may be applied and reversed such that light direction assembly 10 cycles, or moves between the first, second, third, and forth positions at between 120-240 cycles per second. This technique is known as wobulation and is described in the commonly assigned patent applications: "Image Display System Method" Ser. No. 10/213,555, and "A Two-Axis Tip-Tilt Platform" Ser.No. 10/769,255 which are hereby incorporated by reference in their entirety.

Selective and independent control of the current in inner and outer current coils 16, 18 allows light direction assembly 10 to increase the perceived image quality of an image projected therethrough. As discussed above, the force and hence the acceleration of light directing member 12 is directly proportional to the amount of electrical current flowing through inner current coil 16 and outer current coil 18. Decreasing the inductance of the current coils, caused by the flow of current therethrough, by adding shorted turns 30 lowers the coils' resistance to changing current, thereby increasing the acceleration of light directing member 12, which allows for faster position changes and hence an improvement in the projected image. Minimizing the inductance of the current coils is beneficial to lowering the move times between selected positioning of light directing member 12. The lower move times allows for faster positioning and repositioning of light directing member 12 and, hence, improved image quality.

The above-described system and methods provide significant advantages over known systems and methods. Specifically, the degree of controllability and gain and phase margin is improved using shorted turns because the applied voltage and the resultant coil currents are more immediately coupled. The mechanical motion of positioning and repositioning the light directing members may be achieved in less time for the same amount of applied voltage.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A light direction assembly, comprising:
  a tip-tilt platform having a light direction member secured thereto;
  at least one current coil secured to said tip-tilt platform, wherein said at least one current coil has an inductance;
  a plurality of magnetic field producing devices positioned in close proximity to said at least one current coil, wherein said magnetic field producing devices are configured to selectively tilt said tip-tilt platform in response to a current flowing through said at least one current coil; and
  at least one wound shorted turn secured to said tip-tilt platform while positioned in close proximity to and configured to move along with said at least one current coil, wherein said at least one wound shorted turn is configured to reduce the inductance of said at least one current coil.

2. The light direction assembly of claim 1, wherein said light direction assembly further includes at least one pole stand assembly.

3. The light direction assembly of claim 2, wherein said at least one pole stand assembly includes an inner pole stand, a center pole stand, and an outer pole stand.

4. The light direction assembly of claim 1, wherein said the light direction member is configured to receive a projected image comprising rows and columns of pixels, and said light direction member is adapted to selectively tilt said tip-tilt platform, wherein said projected image is moved by a distance of one-half pixel.

5. The light direction assembly of claim 2, further comprising a base member wherein said at least one pole stand assembly is coupled to said base.

6. The light direction assembly of claim 5, wherein said tip-tilt platform is configured to move with respect to said base.

7. A light direction system, comprising:
  at least one light direction assembly including a tip-tilt platform having at least one current coil per bobbin physically secured thereto;
  a base having at least one pole stand assembly including an inner pole stand, a center pole stand, and an outer pole stand, said at least one pole stand assembly having a plurality of magnets coupled thereto and positioned in close proximity to said at least one current coil; and
  at least one wound shorted turn incorporated into said per bobbin configured to move along with the current coil and is inductively coupled to said at least one current coil; and
  a controller configured to cause a current to be applied to said at least one current coil to control at least one rotation direction of said tip-tilt platform, wherein said at least one current coil has an inductance and wherein said at least one wound shorted turn is configured to reduce the inductance of said at least one current coil.

8. The light direction system of claim 7, wherein said at least one light direction assembly is configured to receive a projected image comprising rows and columns of pixels, and said light direction assembly is configured to selectively tilt said tip-tilt platform, wherein said projected image is moved by a distance of one-half pixel.

9. The light direction system of claim 7, wherein said tip-tilt platform is configured to move with respect to said base.

10. The light direction system of claim 9, wherein said controller is configured to move said tip-tilt platform between a plurality of positions.

11. A light direction system, comprising;
  a means for moving a light direction member;
  a means for controlling an electrical current through at least one current coil to control movement of said light direction member, said at least one current coil secured to said means for moving a light direction member; and
  a means for reducing the inductance generated in said at least one current coil wherein the means for reducing the inductance is an at least one wound shorted turn secured to said means for moving a light direction member so as to be configured to move along with and inductively coupled to the current coil.

12. The light directing system of claim 11, wherein the at least one wound shorted turn is incorporated into a bobbin of and proximate to said at least one current coil.

13. A method of digitally modulating light, comprising:
directing light onto a light direction member secured to a tip-tilt platform;
selectively generating an electrical current in at least one current coil secured to said platform so as to cause a plurality of magnetic field producing devices to selectively tilt said tip-tilt platform; and
reducing an electrical inductance of said at least one current coil by inductively coupling at least one wound shorted turn to said at least one current coil, wherein the wound shorted turn is secured to said tip-tilt platform so as to be configured to move along with the current coil.

14. The light direction assembly of claim 1, wherein said at least one current coil and said at least one wound shorted turn are incorporated into a bobbin.

15. The light direction assembly of claim 1, wherein said at least one wound shorted turn surrounds said light direction member.

16. The light direction system of claim 11, wherein said at least one wound shorted turn surrounds said light direction member and is proximate to said at least one current coil.

17. The method of claim 13 wherein said at least one current coil and said at least one wound shorted turn are incorporated into a bobbin.

18. The method of claim 13 wherein said at least one wound shorted turn is positioned to surround said light directing member.

* * * * *

UNITED STATES PATENT AND TRADEMARK OFFICE
CERTIFICATE OF CORRECTION

PATENT NO. : 7,279,812 B2  Page 1 of 1
APPLICATION NO. : 11/037959
DATED : October 9, 2007
INVENTOR(S) : Ted W. Barnes It is certified that error appears in the above-identified patent and that said Letters Patent is hereby corrected as shown below:

In column 1, line 41, delete "10/789,255" and insert -- 10/769,255 --, therefor.

In column 9, line 3, delete "forth" and insert -- fourth --, therefor.

In column 10, line 16, in Claim 4, after "wherein" delete "said".

In column 10, line 59, in Claim 11, after "comprising" delete ";" and insert -- : --, therefor.

Signed and Sealed this

Nineteenth Day of August, 2008

JON W. DUDAS
*Director of the United States Patent and Trademark Office*